W. H. Williams's
Improved
Nut Locking Washer

N° 92241

PATENTED
JUL 6 1869

D. Hammond  
A. J. Vandrach  
} WITNESSES

W. H. Williams, INVENTOR
Job Abbott, ATTORNEY

United States Patent Office.

WILLIAM H. WILLIAMS, OF CANTON, OHIO.

Letters Patent No. 92,241, dated July 6, 1869.

IMPROVEMENT IN NUT-LOCKING WASHER.

The Schedule referred to in these Letters Patent and making part of the same.

*To all whom it may concern:*

Be it known that I, WILLIAM H. WILLIAMS, of Canton, in the county of Stark, and State of Ohio, have invented certain new and useful Improvements in Nut-Locking Washers; and I do hereby declare that the following is a full, clear, and exact description of my invention, reference being had to the accompanying drawings, forming a part of this specification, and to the letters of reference marked thereon, of which drawings—

The nature of my invention consists in the construction of a malleable metallic washer, provided with one or more arms or projections on its inner face and around the bolt-hole, which arms or projections fit into suitable slots or indentations in the bolt-hole in the nut-plate, and thus prevent the washer from turning around the bolt, the nut being secured by said washer from turning, by bending the edges of said washer over the side faces of the nut, whereby I obtain a simple, cheap, and effectual device for preventing nuts from working loose, from jarring, or other causes.

To enable others skilled in the art to make and use my invention, I will proceed to describe its construction and operation.

Figure 5:
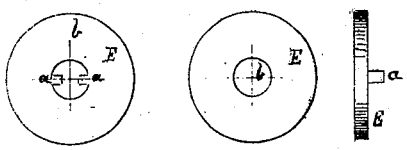
Figures 5 are detail views of washer.

The washer E is punched out of wrought-iron, brass, or any suitable malleable metal, and is conveniently made of the form shown in figs. 5, in which the left-hand figure shows the blank washer as first punched from the sheet-metal, and the centre and right-hand figures show the washer after the arms *a a* have been turned up at right angles with the face of the washer.

Figure 1:
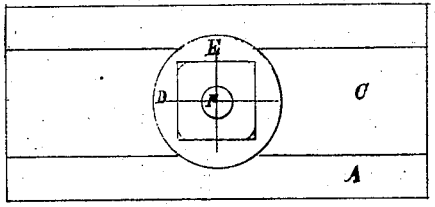
Figure 1 is an elevation, showing an application of my invention.
Figure 2:
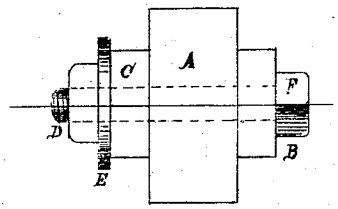
Figure 2 is an end view of the same.
Figure 3:
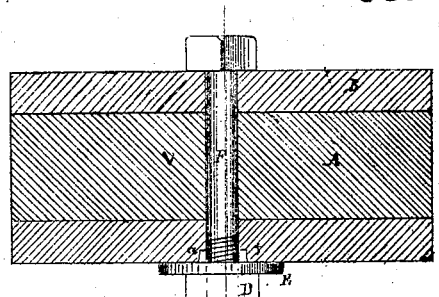
Figure 3 is a longitudinal section of the same.
Figure 4:
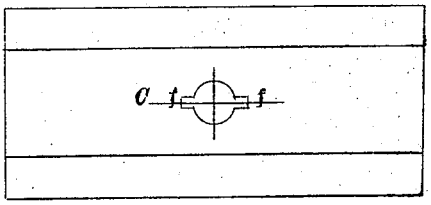
Figure 4 is an elevation of nut-plate.

The nut-plate C, or plate against which the nut or washer has a bearing, has the slots *f f* cut at the sides of the bolt-hole, as shown in fig. 4; which holes are of a suitable size to admit the arms *a a*, which fit in them, as shown in fig. 3.

In the application of this device, herein shown, A represents the web of a railroad-rail, and B C, the fish plates, which are to be secured to it.

The bolt F is passed through the hole in the parts B and C, and the washer E fits over the end, the arms *a a* fitting in the slots *f f* of the nut-plate, as shown.

Figure 6:
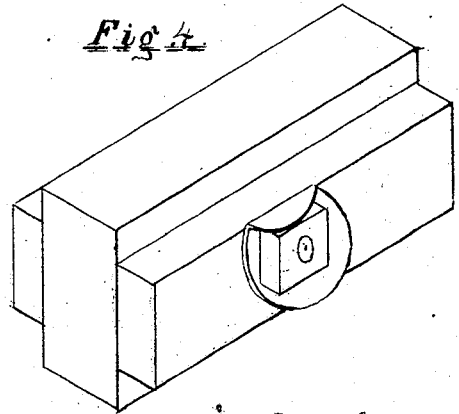
Figure 6 is a perspective view, showing the application of my invention, with the nut locked.

The nut D is then turned on the bolt F until brought up tightly against the washer E, when it is prevented from turning off, by bending the edge of the washer over the side face of the nut, as shown in fig. 6.

It is evident, that with the arrangement shown in fig. 6, the nut D cannot turn, unless the washer E also turns, and that said washer cannot turn as long as the nut D remains screwed up against it, thus securing the arms *a a* in the slots *f f*, in the plate C.

Instead of the bent arms *a a*, depressions could be formed in the washer E, and around the hole *b*, which should fit in corresponding indentations formed around the bolt-hole in the nut-plate C, in a manner readily seen, thus preventing the washer from turning, when pressed into place by the nut.

The peculiar utility resulting from this construction is, first, that the arms or depressions in the washer, and the slots or indentations in the nut-plate, can be made at the same time, and by the same operation that cuts the washer or punches the hole in the nut-plate, so that the application of the invention costs but a trifle; and the second advantage being, that the position of the washer-arms, under the centre part of the nut, allows of the use of very short arms on the washer, as there is no chance for said arms to get out of the slots in the nut-plate until the nut is turned off.

Having thus fully described my invention, I do not claim as new the principle of securing the nut and washer together, by turning the edge of the washer over a side face of the nut; nor do I claim the use of arms on a washer, in connection with slots or indentations in the nut-plate, for the purpose of preventing the washer from turning, when said washer is constructed of inflexible material, or is united to the nut, to be held by other and different means from that herein described; but

What I do claim herein as new, and desire to secure by Letters Patent, is—

The nut-locking washer herein described, the same being constructed of malleable metal, with arms or depressions *a a*, arranged around the bolt-hole *b*, and fitting into slots or indentations *f f*, in the nut-plate, and being caused to lock the nut by the turning of its edge over a side face of the nut, substantially in the manner and for the purpose herein specified.

As evidence that I claim the foregoing, witness my hand, this 31st day of March, 1869.

W. H. WILLIAMS.

Witnesses:
JOB ABBOTT,
D. HAMMOND.